United States Patent
Wietelmann et al.

(10) Patent No.: US 10,431,818 B2
(45) Date of Patent: Oct. 1, 2019

(54) ACTIVE LITHIUM RESERVOIR FOR LITHIUM-ION BATTERIES

(71) Applicant: Rockwood Lithium GmbH, Frankfurt am Main (DE)

(72) Inventors: Ulrich Wietelmann, Friedrichsdorf (DE); Ute Emmel, Frankfurt am Main (DE); Stefan Scherer, Griesheim (DE); Christoph Hartnig, Eppstein (DE)

(73) Assignee: Albemarle Germany GmbH, Frankfurt am Main (DE)

( * ) Notice: Subject to any disclaimer, the term of this patent is extended or adjusted under 35 U.S.C. 154(b) by 576 days.

(21) Appl. No.: 14/891,274

(22) PCT Filed: May 14, 2014

(86) PCT No.: PCT/EP2014/059841
§ 371 (c)(1),
(2) Date: Nov. 13, 2015

(87) PCT Pub. No.: WO2014/184241
PCT Pub. Date: Nov. 20, 2014

(65) Prior Publication Data
US 2016/0111717 A1      Apr. 21, 2016

(30) Foreign Application Priority Data

May 16, 2013   (DE) .................. 10 2013 209 140

(51) Int. Cl.
| | |
|---|---|
| H01M 4/04 | (2006.01) |
| H01M 4/38 | (2006.01) |
| H01M 4/48 | (2010.01) |
| H01M 4/58 | (2010.01) |
| H01M 10/42 | (2006.01) |
| H01M 4/485 | (2010.01) |
| H01M 10/0525 | (2010.01) |

(52) U.S. Cl.
CPC .......... H01M 4/382 (2013.01); H01M 4/0404 (2013.01); H01M 4/0447 (2013.01); H01M 4/48 (2013.01); H01M 4/485 (2013.01); H01M 4/5815 (2013.01); H01M 4/5825 (2013.01); H01M 10/0525 (2013.01); H01M 2010/4292 (2013.01)

(58) Field of Classification Search
CPC .................................................. H01M 4/382
See application file for complete search history.

(56) References Cited

U.S. PATENT DOCUMENTS

| | | | |
|---|---|---|---|
| 4,006,034 | A | 2/1977 | Shimotake et al. |
| 8,329,327 | B2 | 12/2012 | Christensen et al. |
| 9,166,227 | B2 | 10/2015 | Wietelmann |
| 2011/0244334 | A1 | 10/2011 | Kawada |
| 2013/0181160 | A1 | 7/2013 | Wietelmann |
| 2013/0298386 | A1 | 11/2013 | Tarascon et al. |

FOREIGN PATENT DOCUMENTS

| | | |
|---|---|---|
| CN | 102 782 924 A | 11/2012 |
| JP | 2004-079463 A | 11/2004 |
| WO | 99/46224 A1 | 9/1999 |
| WO | WO 0247185 A2 | 6/2002 |
| WO | 2011/061256 A1 | 5/2011 |

OTHER PUBLICATIONS

Barin, Ihsan, "Thermochemical Data of Pure Substances", Part II, VCH Weinheim, 1989, 820-821. (3 pages).
Crivello, J.C., et. al. "Density functional study of Li4NH and Li1.5NH1.5 as intermediary compounds during hydrogenation of Li3N." Phys. Rev. B, 2010, 81, 104113. (11 pages).
Li, W. et al., "Li+ Ionic Conductivities and Diffusion Mechanisms in Li-based Imides and Lithium Amide", Phys. Chem. Chem. Phys., 2012, 14, 1596-1606.
Meyer, B., et al. (2008) "Application of Stabilized Lithium Metal Powder in Lithium Ion Batteries". Paper presented at the 43rd Power Sources Conference, Philadelphia, Pennsylvania, Jul. 7-10 (pp. 105-108).
Rabenau, A., "Lithium Nitride and Related Materials Case Study of the Use of Modern Solid State Research Techniques", Solid State Ionics, 1982, 6, 277-293.
Shanmukaraj, D., et al., "Sacrificial Salts: Compensating the Initial Charge Irreversibility in Lithium Batteries", Electrochem. Commun., 2010, 12, 1344-1347.

*Primary Examiner* — Peter F Godenschwager
(74) *Attorney, Agent, or Firm* — Marcy M. Hoefling; Troy Kleckley; Nathan C. Dunn

(57) ABSTRACT

The present invention relates to methods for providing an active lithium reservoir to reduce the irreversible initial losses and as a general lithium source of or for electrode materials and lithium batteries, and a powdered lithium-donating material having an electrochemical potential of 0.5 and 2 V vs. Li/Li$^+$, which has been selected from the group of lithium hydride, lithium amide, lithium imide and tetra-lithium ammonium hydride, is used as a general lithium source.

16 Claims, No Drawings

ACTIVE LITHIUM RESERVOIR FOR LITHIUM-ION BATTERIES

REFERENCE TO RELATED APPLICATIONS

This is a National Stage entry of International Patent Application PCT/EP2014/059841, filed on May 14, 2014, which application claims priority from German Application No. 102013209140.0, filed May 16, 2013. Each patent application identified above is incorporated herein by reference in its entirety.

The present invention relates to methods for providing an active lithium reservoir to reduce irreversible initial losses and as a general lithium source of or for electrode materials and lithium batteries.

Lithium-ion batteries are manufactured in the discharged state. This has the advantage that both electrodes are stable in air and water. The electrochemically active lithium is introduced exclusively in the form of the cathode material (these are mostly lithium metal oxides, for example, lithium cobalt oxide, $LiCoO_2$). Given that the anode material (in today's commercial batteries, this is graphite; however, future versions may also use alloy materials which are, for example, silicon or tin-based) are lithium-free, all lithium comes from the cathode material. In actual battery systems, a part of this lithium is lost by irreversible processes, in particular, during the first charging/discharging cycle. Moreover, a disadvantage of the classic lithium-ion battery design having lithium-free graphite as an anode is that all lithium has to be introduced by the lithiated cathode material. Lithium-free potential cathode materials (for example, $MnO_2$) can, for this reason, not be used.

In the case of graphite, it is assumed that, in particular, oxygen-containing surface groups irreversibly react with lithium to form stable salts during the initial charging. This lithium is lost for the subsequent electrochemical (irreversible) charging/discharging processes. Similar is the case of alloy anodes, for example, silicone or tin anode materials. Oxidic contaminants consume lithium according to:

$$MO_2 + 4Li \rightarrow M + 2Li_2O \quad (1)$$

(M=Sn, Si, etc.)

The lithium bonded in form of $Li_2O$ is electrochemically no longer active. When using anode materials having a potential of <ca. 1.5 V, a further part of the lithium is irreversibly expended for the formation of a passivation layer (a so-called solid electrolytic interface, SEI) on the negative electrode. In the case of graphite, approximately 7 to 20% of the lithium introduced by the positive mass (thus, by the cathode material) is lost in this manner. These losses are typically even higher in the case of tin or silicone anodes. According to the following equation (2), the delithiated, "left-over" transition metal oxide (for example, $CoO_2$) is not able, owing to the missing active lithium, to contribute to the electrochemical capacity of the galvanic cell:

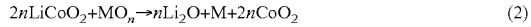

$$2nLiCoO_2 + MO_n \rightarrow nLi_2O + M + 2nCoO_2 \quad (2)$$

(M=Si, Sn etc.; n=1 or 2)

Many studies exist which have the goal to minimize or to completely compensate for these irreversible losses of the first charging/discharging cycle. This limitation can be overcome in that additional lithium is introduced into the battery cell in metallic form, for example, as stabilized metal power (SLMP) (for example, US2008283155A1; B. Meyer, F. Cassel, M. Yakovleva, Y. Gao, G. Au, Proc. *Power Sourc. Conf.* 43rd 2008: 105-108). This, however, has the disadvantage that the usual methods for manufacturing lithium-ion batteries cannot be executed. According to the state of the art, passivated lithium reacts with the main air components oxygen and nitrogen. The kinetics of this reaction is significantly slowed in comparison to non-stabilized lithium; however, a change of the surface and a reduction of the metal content is to be expected when longer exposed to air, even under drying room conditions. An even more significant disadvantage is the extremely violent reaction of Li metal powder with the solvent N-Methyl-2-pyrrolidone (NMP) often used for the manufacture of electrodes. Providing stabilized or coated lithium powders have made significant progress towards safe handling; however, the stability of stabilized lithium powders according to the state of the art is often not sufficient to guarantee, under real-life conditions, a risk-free usage of passivated lithium powder in the case of NMP-based suspension processes. While uncoated or insufficiently coated metal powders already at room temperature violently react (runaway reaction) with NMP after a short induction period, in the case of coated lithium powders, this process only takes place at increased temperatures (for example, 80 or 100° C.). To this end, the US2008/0283155 describes that the lithium powder coated with phosphoric acid from Example 1 reacts extremely violently (runaway reaction) directly after mixing at a temperature of 30° C., while a powder additionally coated with wax remains stable for at least 24 hours at a temperature of 30° C. in NMP. The lithium powders coated according to the publication WO2012/052265 are kinetically stable up to approximately 80° C. in NMP; however, they exothermically decompose at temperatures exceeding this threshold, in part under conditions similar to a runaway reaction.

If lithium metal and NMP react, large energy quantities can be expected to be released and the reaction mixture violently decomposes when vapors and gases are released. In the case of producing an electrode suspension, a thorough mixing has to occur. This mixing process may damage the protective passivation layer and lower the temperature of the beginning decomposition reaction ($T_{onset}$).

The publication WO2011/157958A1 suggests the usage of sacrificial salts to compensate for the irreversible losses of the first charging process, and the sacrificial salt is a cation $E^+$ selected from the group $Li^+$, $Na^+$, $K^+$ or an onium and the anion redox (active) is selected from the group of azide, ketocarboxylate or hydrazide, and the sacrificial salt has a higher potential than the active material of the negative electrode. The redox potential of the sacrificial salt is to be between 2.0 and 4.6 V.

Disadvantages of this method are that the sacrificial salts are in part toxic and explosive (lithium azide) which are in most cases not commercially available (hydrazide and ketocarboxylate) or only decompose at oxidation potentials which are too high (>4 V ($Li_2C_3O_5$, $Li_2C_4O_6$), partially only at >4.5 V (lithium oxalate), thus, outside of the voltage range of typical lithium-ion batteries (M. Armand et al., *Electrochem. Commun.* 12 (2010): 1344-7).

The publication DE102010044109A1 describes a galvanic element which includes a substantially transition metal-free, oxygen-containing conversion anode. Said conversion anode includes lithium hydride in the charged state. The anion of this lithium compound, the hydride ion, is oxidation-resistant only to a limited extent: when exceeding a charge potential of approx. 0.71 V vs $Li/Li^+$, the hydride ion oxidizes to an elemental hydrogen. In order to prevent a decomposition of the lithium hydride and an escape of the hydrogen necessary for the functioning of the electrochemical cells including oxygen-containing conversion anions (that is, to ensure the reversibility according to the equation 2 LiOH+4 Li ⇔ 2 Li$_2$O+2 LiH), it is essentially important that the anode is not charged above a potential of approx. 0.71 V vs Li/Li$^+$.

The object of the present invention is to disclose methods to compensate for irreversible lithium losses during the first charging cycles of lithium batteries by way of lithium-donating additives, using commercially available lithium-donating additives having a sufficiently low oxidation potential so that it can be used for all typical cathode materials, that is, cathode materials which have electrochemical potentials in the range of 2.5 and 6 V vs Li/Li$^+$.

Furthermore, the lithium-donating additive is to be as stable as possible in polar aprotic organic solvents such as N-Methyl-2-pyrrolidone, that is, up to a temperature of approx. 50° C., and is not to show a type of runaway reaction when exceeding this temperature.

According to the present invention, this object is achieved in that a lithium-donating material in form of a lithium compound is used as an active lithium reservoir, the anions of which decompose at an electrochemical potential between 0.5 and 2 V vs. Li/Li$^+$ under formation of gaseous products. Particularly suitable are hydrogen-containing lithium compounds, either mixed or in pure form, which are selected from the group of lithium hydride, lithium amide, lithium imide and tetra-lithium ammonium hydride. These compounds decompose when exceeding its standard oxidation potential in an electrochemical cell after applying an appropriate potential under release of lithium and gaseous by-products:

$$\text{Li}_x\text{N}_y\text{H}_z \rightarrow x\text{Li}^+ + xe^- + y/2\text{N}_2 + z/2\text{H}_2 \quad (3)$$

with x=1, 2 or 4; y=0 or 1; z=1 or 2.

The hydrogen-containing compounds according to the present invention may release a part of the hydrogen also in form of ammonia (NH$_3$) which is also gaseous. In order to operate as an active lithium reservoir according to the present invention, it is crucial that the polarization of the electrode containing the lithium-donating additive is sufficiently high during the formation process of the electrochemical cell (these are the first charging/discharging cycles) to cause the decomposition of the additive under release of lithium according to the general formula (3). This necessary polarization equates at least to the standard oxidation potential (in this sense: decomposition potential) of the lithium-donating additive. The following table sets out the standard oxidation potentials of the pure compounds according to the present invention:

| Lithium-donating additive | Standard Gibbs energy ΔG°$_f$ (kJ/mol) | Standard oxidation potential E vs. Li/Li$^+$ (V) | Source/Comment |
|---|---|---|---|
| LiH | −68.4 | 0.71 | Ihsan Barin. Thermochemical Data of Pure Substances, Part II, VCH Weinheim 1989. |
| LiNH$_2$ | | 1.16 | P. Chen. Phys.Chem.Chem.Phys. 2012 (14): 1596-1606. |
| Li$_2$NH | | 0.70 | P. Chen. Phys.Chem.Chem.Phys. 2012 (14): 1596-1606. |
| Li$_4$NH | −206.7 | 0.54 | Crivello et. Al. "Density functional study of Li$_4$NH and Li$_{1.5}$NH$_{1.5}$ as intermediary compounds during hydrogenation of Li$_3$N." ICPME 26 Nov. 2010 |
| Li$_3$N (comparative example) | −122.2 | 0.44 | A. Rabenau, Solid State Ionics 6 (1982): 277-293. |

The decomposition voltage expended in a practical application for the decomposition according to equation (3) may vary within certain limits. Furthermore, said decomposition voltage is a function of the temperature and the electrical bonding, that is, the quality of the electrical contacting of the lithium particles. In a specific individual case, a potential exceeding the above mentioned standard oxidation potential may thus be necessary to release the lithium. The skilled person recognizes, among other things, the lithium release by the accompanying gas formation and, in this manner, may set the appropriate potential range. The lithium-donating additives according to the present invention may be introduced in different ways into an electrochemical cell by an aprotic electrolyte. The first possibility is to mix solid electrode materials (anode or cathode materials), in the absence of a solvent, with the additive and additional components, for example, conductivity additives (such as graphite and carbon black) as well as binders (for example, PTFE powders) and then to apply this mixture by way of a mechanical procedure (pressing, calendaring) to a current collector foil.

Suspension (i.e., dispersant-bound) processes are, however, also possible. Selecting the appropriate dispersant, typically an organic, aprotic solvent, depends, among other things, on the used binding agent. For example, if polyisobutylene is used as a binder, inert gases, that is, low-reactive hydrocarbons (both, unsaturated and saturated compounds such as toluene, xylene, hexane or decane) may be used. When using polyvinylidene difluoride (PVdF), polar solvents, for example, N-Methyl-2-pyrrolidone (NMP) or acetone may be used because the mentioned fluorinated binding agent does not dissolve in non-polar solvents such as hydrocarbons. Surprisingly, it has been discovered that, for example, lithium hydride reacts less violently with NMP than lithium metal or lithium nitrate does.

In order to demonstrate this, mixtures made out of dried NMP (water content of 164 ppm) and coated lithium metal powder (produced according to WO2012/052265) and pulverized lithium salts under inert gas atmosphere were dispensed into GC gas bottles and then heated in stages. In this instance, the following observations have been made:

| Lithium-donating additive | 2 h approx. 25° C. | 2 h 50° C. | 1 h 80° C. | 1 h 100° C. | 1 h 120° C. |
|---|---|---|---|---|---|
| Coated lithium powder | No change | No change | No change | very violent reaction under gas | not applicable |

-continued

| Lithium-donating additive | 2 h approx. 25° C. | 2 h 50° C. | 1 h 80° C. | 1 h 100° C. | 1 h 120° C. |
|---|---|---|---|---|---|
| (comparative example) Lithium hydride | No change | No change | No change | formation, black mixture No change | yellow coloring; solid after cooling; no gas formation |
| Lithium amide | No change | yellow coloring, liquid | yellow coloring; solid after cooling; no gas formation | not applicable | not applicable |
| Lithium imide | No change | yellow coloring, liquid | yellow coloring; solid after cooling; no gas formation | not applicable | not applicable |
| Tetra-lithium ammonium hydride | No change | yellow coloring, liquid | yellow coloring; solid after cooling; no gas formation | not applicable | not applicable |
| Lithium nitrate (comparative example) | reacts immediately; self-heating to approx. 80° C. | not applicable | not applicable | not applicable | not applicable |

Lithium nitrate already reacts with NMP at room temperature; however, this is without gases forming or that a noteworthy pressure build-up could be observed in the closed system. In contrast, the mixtures with the Li-compounds lithium amide, lithium imide and tetra-lithium ammonium hydride are considerably more stable. While at room temperature no visible changes occur over a period of hours and, in particular, no gas formation takes place either, a yellow coloring of the mixture may be observed at a storage temperature above 50° C. The mixture, however, remains liquid, even after cooling to room temperature (RT). Surprisingly, the lithium hydride-containing suspension proves to be most stable. Even at a temperature of 100° C. a visible change is not observed and the mixture remains liquid, even after cooling to RT. At a temperature of 120° C., the mixture takes on a yellowish color and the solvent appears to polymerize: after cooling to RT, a yellowish, polymer-like solid matter is present. A formation of gas does not accompany the decomposition process, that is, no build-up of pressure is observed in the closed vessel.

The coated lithium reacts very violently at temperatures above approx. 100° C. and specifically under formation of vapors and permanent gases. In closed containers, a respective sudden build-up of pressure may be expected. In contrast, surprisingly no gases are formed for all lithium-donating additives according to the present invention and the decomposition occurs by polymerization of the solvent under release of only a mild reaction heat.

The decomposition heat has been determined by way of differential scanning calorimetry (DSC). A device by the company Systag, Switzerland (Radex system) has been used. Approximately 2 g NMP and 100 mg of the lithium-donating additive according to the present invention are weight out into the sample vessel under protective gas atmosphere. These samples have been heated to an end temperature of 180° C. at a heat-up rate of 45 K/h. The temperature at which an exothermic decomposition starts is referenced by $T_{onset}$.

| Mixture of NMP with | $T_{onset}$ (° C.) | $\Delta H_{dec}$ (J/g mixture) | Pressure after cooling to RT (bar) |
|---|---|---|---|
| Coated Li-powder (comparative example) | 90 | 380 | 6 |
| $LiNH_2$ | approx. 55 | approx. 80 | none |
| $Li_2NH$ | 75 | 89 | none |
| LiH | 95 | 65 | none |

It is evident that lithium hydride is safest to handle when in contact with NMP: the decomposition process starts at extremely high temperatures, it is least exothermic and no gases are formed. For this reason, it is preferred to use lithium hydride powder when manufacturing electrodes in NMP. If less reactive solvents, for example, hydrocarbons or ether are used to produce the suspension, the other lithium-donating additives according to the present invention may also be used.

The lithium-donating additive(s) is/are used as a powder. The powdered particles have a maximum diameter of 500 μm, preferably a maximum diameter of 200 μm. Particularly preferably, the median particle size distribution ($D_{50}$) ranges between 1 and 100 μm.

The lithium-donating additive according to the present invention may also be used for the lithiation of electrochemical active anode materials, for example, graphite, alloy, insertion or conversion materials, for lithium batteries. This lithiation process may take place at the material level outside of an electrochemical cell (ex situ) or, preferably, within an electrochemical cell (in situ).

In a lithiation outside of an electrochemical cell, an electrochemical active material having a higher standard oxidation potential than the used lithium-donating additive is brought into contact with said lithium-donating additive. This process is preferably carried out under inert gas (argon, nitrogen) or dry air (maximum dew point is −30° C.) at ambient temperatures or at warm temperatures, preferably in the temperature range of approximately 20 and 80° C. In order to complete the conversion, the mixture made out of one or a plurality of electrode material(s) and the lithium-donating additive under conditions of homogenizing or milling is carried out either in a solvent agent suspension or in form of the solid matter mixture. Particularly preferably, the mixture out of electrode material and lithium-donating additive is contacted under milling conditions. According to the state of the art, rod, vibration, impact or ball mills are suitable for this process. The grinding process may be carried out in the presence or absence of aprotic solvents, for example, NMP, ethers or hydrocarbons. In solvent-assisted grinding, the use of hydrocarbons (aromatic or aliphatic [hydrocarbons] having boiling points between approx. 50 and 300° C.; also commercially available mixtures) is preferred.

Other forms of mechanical activation may also be used. For example, the conversion between the solid particles may be promoted by irradiating ultrasound or microwaves. The ultrasonic treatment is preferably carried out in suspension under use of an aprotic liquid suspension agent.

As an example for such a purely chemical conversion, the reaction of a transition metal oxide with lithium hydride is formulated:

$$\text{LiH} + 2\text{MnO}_2 \rightarrow \text{LiMn}_2\text{O}_4 + \tfrac{1}{2}\text{H}_2 \quad (4)$$

The other version of the method, that is, the releasing of lithium and the lithiation in the electrochemical cell (in situ), occurs in the first charging process or in the first charging/discharging cycle. For this purpose, the mixture out of electrode material and lithium-donating additive according to the present invention is, optionally with the use of additional auxiliary agents (such as binders and/or additives improving conductivity), applied to a current collector foil (casting method, spin coating, air-brush method, etc.). If this process is carried out by using a solvent (for example, NMP or hydrocarbon, thus, as a suspension casting method), this solvent is first removed in a subsequent step. Thereafter, the dried pre-electrode may be further mechanically treated (for example, calendaring) and then be installed in a battery cell according to the state of the art. In the present case, the releasing of the lithium from the lithium-donating additive according to the present invention is carried out completely or at least predominately only when exceeding the charging potential above the stability range of the used additive. This potential (the so-called decomposition voltage) is, when using lithium hydride, for example, approx. 0.71 V vs. Li/Li$^+$. Since this co-called formation process is accompanied by a formation of gas, it is preferable to ensure a pressure compensation during the first or the first to fifth cycles, that is, the first cycles are run having an unsealed cell housing. The electrochemical cell is sealed only after the complete development and removal of the gaseous by-products. Depending on the used lithium-donating additive, hydrogen, ammonia and/or nitrogen form as gaseous by-products. For example, the oxidative decomposition of lithium hydride runs at a potential of ≥approx. 0.71 V vs. Li/Li$^+$ according to the following equation:

$$\text{LiH} \rightarrow \text{Li}^+ + e^- + \tfrac{1}{2}\text{H}_2 \quad (5)$$

In order to ensure the best possible electrical contacting of the lithium-donating additive, a liquid or gel-type electrolyte is preferably used.

Since the additives according to the present invention decompose at a potential under 2 V vs. Li/Li$^+$, all known cathode materials, specifically such materials having a redox potential of ≥2 V, preferably ≥2.5 V vs. Li/Li$^+$, may be used for the positive electrodes (cathode). The following may be, inter alia, used as cathode materials: elemental sulfur, metal sulfides (for example, TiS$_2$, MOS$_2$), metal oxides (for example, MnO$_2$, vanadium oxides), lithium metal oxides (for example, LiCoO$_2$, LiMn$_2$O$_4$, LiMnO$_{1.5}$, Ni$_{0.5}$, Li(Mn, Co, Ni)O$_2$, etc.) and lithium metal phosphates (LiFePO$_4$, LiMnPO$_4$, LiCoPO$_4$, etc). For the negative electrode (anode), carbon-based materials (graphites, graphenes, coking coal, etc.), materials capable of alloying (for example, Si, Sn, Al or Co-based) or transition metal nitrates may be used, inter alia.

The amount of additives according to the present invention which is to be expended varies case by case; it is primarily a function of the used active electrode materials and the employed electrolytes. Depending on the used electrolytes, different amounts of lithium are required for the formation of SEI. The maximum total amount of lithium-donating additive is preferably as high as the maximum lithium intake capacity of the electrode materials by intercalation (that is, the reversible storing of lithium into the considered electrode material), alloying or any other absorption (for example, irreversible reaction with surface groups) plus the amount of lithium which is irreversibly used up for the formation of the protective layer (SEI formation), in particular, on the negative electrode (anode).

What is claimed is:

1. A method for providing an active lithium reservoir for lithium batteries from at least one hydrogen-containing lithium-donating additive selected from the group of lithium hydride, lithium amide, lithium imide and tetra-lithium ammonium hydride, which method comprises in an electrochemical cell, electrically contacting the lithium-donating additive and a voltage which is at least equal to the standard oxidation potential of the lithium-donating additive; or outside an electrochemical cell, contacting the lithium-donating additive and an electrode material having a higher standard oxidation potential than the lithium-donating additive;

causing the lithium-donating additive to decompose to release lithium.

2. The method according to claim 1, characterized in that the at least one lithium-donating additive is mixed with at least one electrode material, wherein the release of lithium under simultaneous lithiation of one of these electrode materials occurs within an electrochemical cell in situ.

3. The method according to claim 2, characterized in that the maximum amount of lithium-donating additives used equates to maximum lithium intake capacity of the electrode material by intercalation, alloying or other absorption plus the amount of lithium which is irreversibly used up for formation of a protective layer.

4. The method according to claim 1, characterized in that the lithium-donating additive is introduced in the form of an electrode into an electrochemical cell as a mixture having at least one material capable of absorbing lithium and is employed therein.

5. The method according to claim 4, characterized in that the lithium-donating additive is applied to a current collector foil as a mixture having at least one material capable of absorbing lithium and one binding agent.

6. The method according to claim 1, characterized in that at least a first charging/discharging cycle is run in an unsealed cell housing.

7. The method according to claim 1, characterized in that the electrochemical cell has an electrolyte which is liquid or gel-like.

8. The method according to claim 1, characterized in that the electrochemical cell comprises cathode materials which are selected from elemental sulfur, metal sulfides, metal oxides, lithium metal oxides and lithium metal phosphates.

9. The method according to claim 1, characterized in that the electrochemical cell has a negative electrode which comprises carbon-based materials, materials capable of alloying with lithium or transition metal nitrates.

10. The method according to claim 1, characterized in that the electrode material having a higher standard oxidation potential than the employed lithium-donating additive is brought into contact with the lithium-donating additive, wherein the lithium-donating additive has a standard oxidation potential which is between 0.5 and 2 V vs. Li/Li$^+$ under inert gas or dry air having a maximum dew point of −30° C. at a temperature in a range of 20° C. to 80° C. to lithiated ex situ.

11. The method according to claim 10, characterized in that the electrode material and the lithium-donating additive are brought into contact in dry form under milling conditions or in the absence of a liquid dispersant.

12. The method according to claim 10, characterized in that lithium hydride is the lithium-donating additive.

13. The method according to claim 1, characterized in that the lithium-donating additives are employed as powder-containing particles having a maximum diameter of 500 μm.

14. The method according to claim 13, characterized in that the median particle size distribution ($D_{50}$) ranges between 1 and 100 μm.

15. The method according to claim 1, characterized in that the lithium-donating additive is employed as a lithium hydride powder having a median particle size distribution ($D_{50}$) in the range of 1 and 100 μm.

16. The method according to claim 1, characterized in that lithium hydride is the lithium-donating additive.

* * * * *

UNITED STATES PATENT AND TRADEMARK OFFICE
CERTIFICATE OF CORRECTION

PATENT NO. : 10,431,818 B2  
APPLICATION NO. : 14/891274  
DATED : October 1, 2019  
INVENTOR(S) : Ulrich Wietelmann et al.

Page 1 of 1

It is certified that error appears in the above-identified patent and that said Letters Patent is hereby corrected as shown below:

On the Title Page

Item [56], should read:
-- 8,124,279      A         2/2012   Petrat et al.
20020102462   A1      8/2002   Huggins et al.
20080283155   A1    11/2008   Yakovleva et al.
20120214057   A1      8/2012   Wietelmann
20120225356   A1      9/2012   Wietelmann --

Signed and Sealed this
Tenth Day of December, 2019

Andrei Iancu
*Director of the United States Patent and Trademark Office*